United States Patent Office 3,276,139
Patented Oct. 4, 1966

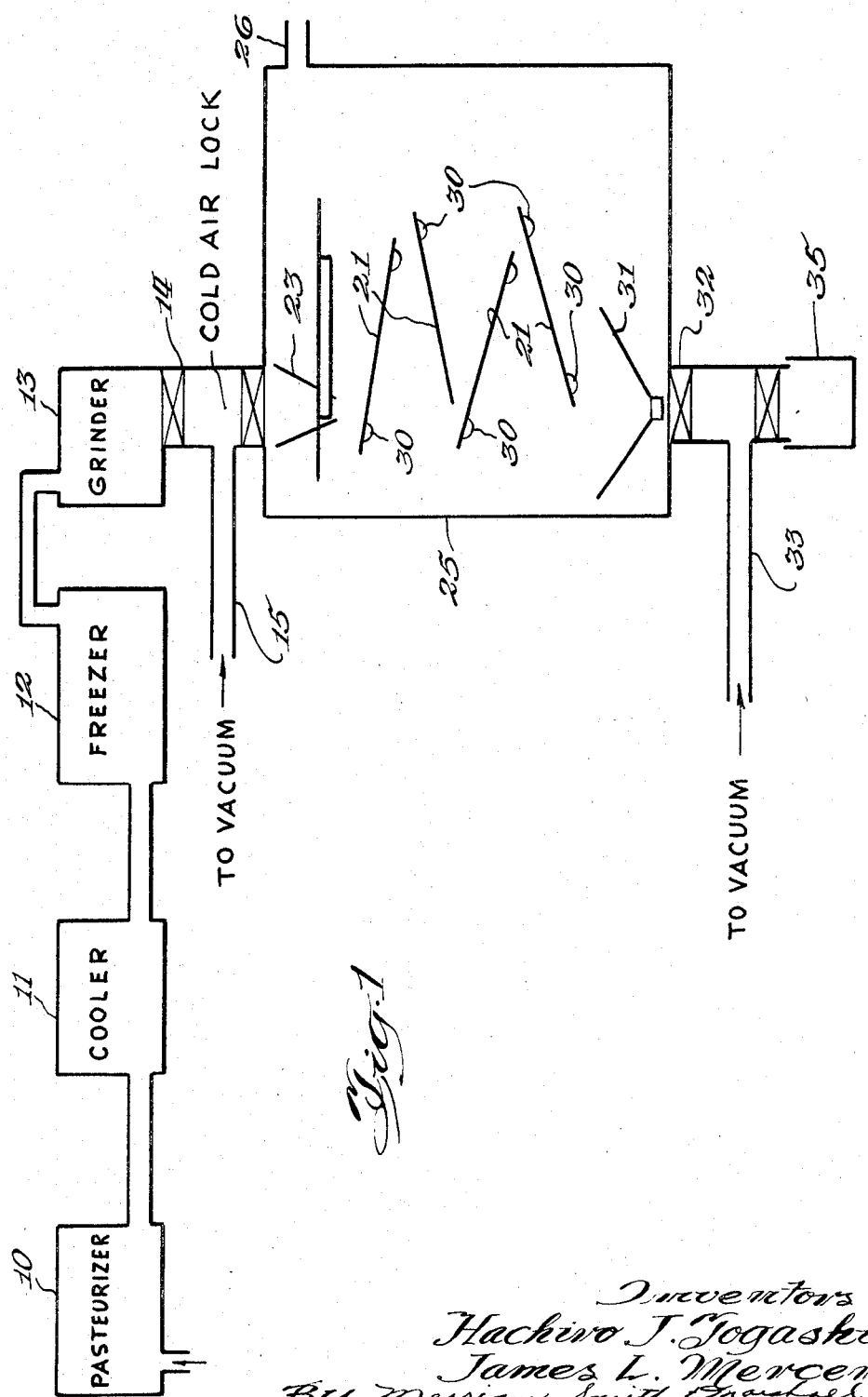

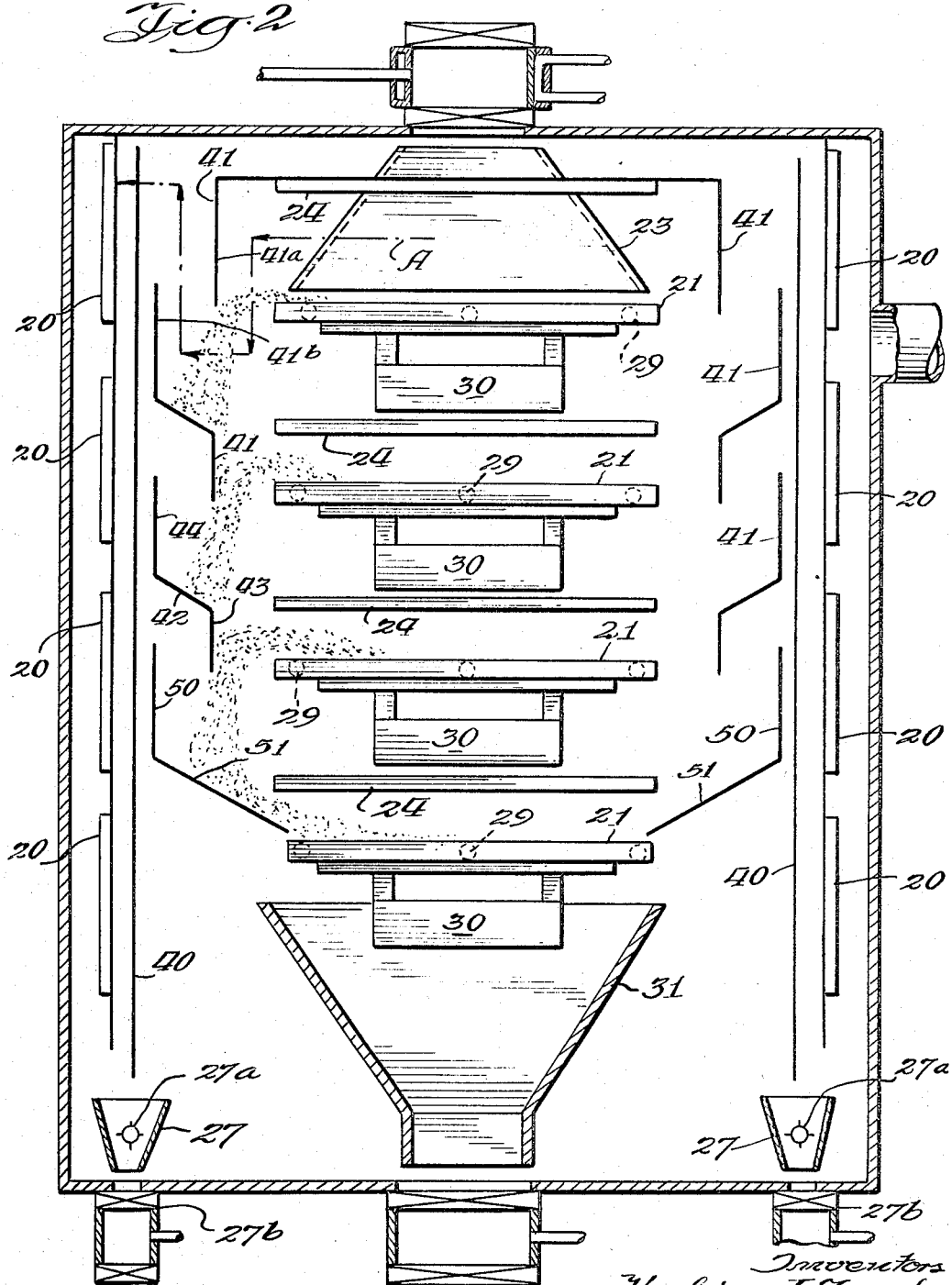

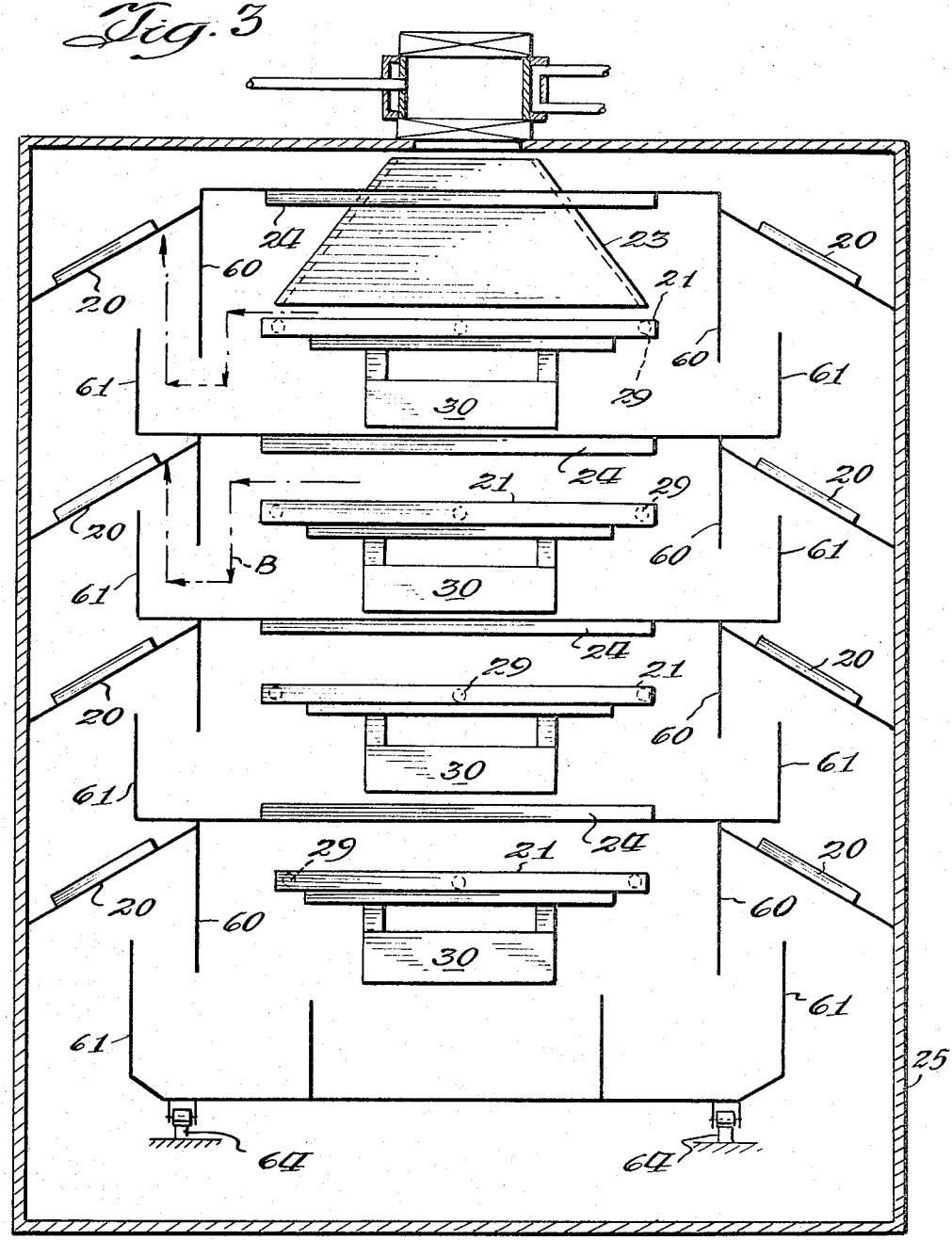

3,276,139
ENTRAINED PARTICLE REMOVAL METHOD
AND APPARATUS
Hachiro J. Togashi, Chicago, and James L. Mercer, Arlington Heights, Ill., assignors to Cyro-Maid, Inc., Palatine, Ill., a corporation of Delaware
Filed Feb. 25, 1964, Ser. No. 347,247
6 Claims. (Cl. 34—73)

This invention relates to removing solid particles entrained in a vapor and the method and apparatus for accomplishing the same.

Our pending application, Serial No. 263,284, filed on March 6, 1963, pertains to a method for drying frozen particles. It was therein disclosed that the rapid and economical drying of products containing a large percentage of water could be accomplished by first quickly freezing the product to be dried out, after shredding or grinding the frozen product into small particles, if necessary, introducing it to a dehydrating zone wherein the water in each of the particles is caused to be sublimed at a low temperature and pressure. In the dehydrating zone, the particles are moved along a pathway while being agitated, as by a series of vibrating trays, while being supplied with radiant energy to furnish the heat of sublimation necessary for drying.

Once in the dehydrating zone, the product particles are dried, with the frozen water subliming so that no thawing occurs, the thawing being prevented by maintaining the pressure and temperature in the dehydrating zone sufficiently low so that the refrigerating effect caused by the sublimation of the ice crystals in the particles serves to keep them solidly frozen. It has been found for our purposes that maintaining the pressure in the dehydrating zone below about 500 microns of Hg is satisfactory although it is appreciated this pressure could be varied, if desired.

Following sublimation of the ice crystals, the water vapor, because of the conductance afforded by our system, travels at an unimpeded high velocity to the condenser or cryoplate sections which are incorporated in the system for maintaining a low pressure in the overall drying process. The water vapor, upon contact with the condenser section surfaces, condenses in the form of ice. The ice is preferably removed from the surfaces of the various condenser sections in the manner disclosed and claimed in our pending application, Serial No. 347,156, filed February 25, 1964, the removed ice falling by gravity into a breaker which reduces the ice to smaller pieces where it is then removed from the system.

It has been found in instances where the products to be dried are shredded or ground there is associated with the comminuting operation a creation of fine product particles, these particles being of a size about fifty mesh or smaller. In the course of the drying operation, these fine particles are entrained in the stream of water vapor evolved during the rapid dehydration of water-laden material. Water vapor is evolved from the products being dried in the process at such a high rate that there results a high velocity vapor stream from the products being dried to the condenser sections. This high velocity vapor can entrain fine particles and carry them to the condenser sections where they are then lost either in the ice or in the course of ice removal. In both the continuous and static product drying systems where many thousands of pounds of dried product may be processed, any loss of product is a substantial financial factor to be considered in the drying operation. It is readily apparent that such loss of product should be prevented or reduced if possible.

A possible solution to the problem is to classify the material prior to dehydration and remove all fine particles. The fine particles can then either be melted, frozen and then reground, or they can be introduced into the drying process at a point where the bulk of the water has been removed, i.e., at a point where the vapor velocity is low enough that the particles will not be re-entrained. There are a number of significant disadvantages to this proposal. Initially, employing additional steps in the process serves to increase the cost of producing the dried product. Further, additional special equipment is required to handle the frozen fine particles which not only necessitates increased floor space but also creates additional material handling problems.

In order to obviate this particle loss problem, we have invented a novel system whereby minimization of particle loss is achieved at a nominal expense. In accordance with the invention, we insert a series of deflecting plates between the dehydrating zone and condenser sections to permit the removal of product particles entrained in the vapor. It has been determined that the vapor, which travels rapidly to the surfaces of the various condenser sections, is forced to change direction with the insertion of deflecting plates. However, the inclusion of the deflecting plates to our system does not impede the conductance of the water vapor to the surfaces of the condenser sections. Because of the vapor deflection caused by the plates, the product particles are unable to maintain the same velocity as the water vapor and therefore drop out of the vapor stream and, as a result, can be collected and returned to the total dried product.

The invention will be better understood from the following detailed description thereof, taken in conjunction with the accompanying drawings, in which the same numbers are used to refer to corresponding items, and in which:

FIGURE 1 is a diagrammatic flow sheet of the continuous process;

FIGURE 2 is a front view of the dehydrating chamber in partial section in which the deflecting plates are illustrated; and FIGURE 3 is a front view of the dehydrating chamber in partial section employed in the static drying process.

Referring generally to FIGURE 1, the product, assuming its normally liquid, may be introduced, if necessary, to pasteurizer 10 and then passed to pre-cooler 11 where it is cooled to almost the freezing point. Following, the product passes to freezer 12 where it is quickly frozen to a temperature on the order of −10° to −25° C. or lower, if desired.

If required, the product is shredded or ground to the desired particle size in grinder 13 which will not substantially increase the product temperature but which will preferably produce particles of a uniform size. The frozen material is ground to a relatively fine mesh size in order to increase the surface area available for the sublimation of the ice. At the same time, the particles cannot be ground too fine because of a propensity to become entrained in the stream of water vapor flowing to the condenser sections.

The frozen particles are passed to air lock 14, wherein all air is removed and the particles are held in a vacuum of about 400 to 800 microns subject to their introduction to drying chamber 25. A vacuum pump (not shown), preferably involving a cryoplate condenser, communicates with air lock 14 through conduit 15. The frozen particles are fed at desired intervals from air lock 14 into hopper 23 and from the hopper to tray 21, situated below hopper 23. Hopper 23 and air lock 14, if desired, may be refrigerated.

Drying chamber 25 contains one or more stacks of trays 21 bounded on each side by many individual condenser sections 20. The sections are maintained at a suitably low temperature, usually about −30° F. and preferably below −50° F., by any suitable means, e.g., Dry Ice, mechanical refrigeration, or liquid cryogens. It is to be appreciated that the temperature range recited here is for purposes of illustration only and is not to be construed as a limiting feature of our invention. Condenser sections 20 function as high-speed pumps, maintaining a low pressure by causing water vapor and other condensable gases to freeze on the surfaces of the respective sections. Each condenser section 20 is provided with connections 28 leading to a source of refrigerating medium.

One or more conduits 26 are provided for connection to an evacuating system (not shown) capable of rapidly reducing the pressure in chamber 25 at the beginning of the drying operation. After the device is once in operation, the vacuum system which communicates with the conduits 26 largely idles and is used only for the purpose of removing any noncondensable gases which may have found their way into the system.

Trays 21 are agitated by vibrators 30 in order to impart a dancing or multidirectional motion to the frozen particles. As the particles move along on vibrators 30, they pass under a source of radiant energy which may comprise heated plates 24 heated electrically or by any other suitable means. Upon heating, sublimation occurs and the frozen water contained in the particles to be dried turns to vapor which rapidly travels to the surfaces of condenser sections 20 where it accumulates on the surfaces in the form of ice.

Cooling means 29, suitably in the form of conduits or coils embedded within or attached to the underside of trays 21, are provided for cooling the trays so that the frozen particles will not thaw and agglomerate or stick to trays 21.

Upon completion of the drying operation, the dried particles are collected in hopper 31, from where they pass through air lock 32 which may be refrigerated, if desired, and then to receiver 35. Vacuum connection 33 is provided for evacuating air lock 32.

In the course of the drying operation, the water content in solid form in the product particles sublimes and the vapor travels to condenser sections 20. The conductance of the system is larger than the rate at which water vapor is evolved at substantially all points in the system where the product is dehydrated. As discussed in our pending application, Serial No. 220,328, by providing high conductance in the dehydrating zone of the invention, rapid removal of the evolved water vapor from the frozen particles, relative to the rate of evolved vapor, is assured. This rapid removal prevents localized increases in pressure which influence the thawing or scorching of the product.

The vapor evolved from the product carries with it a small percentage of the finely ground particles. Heretofore, the vapor and particles entrained therein traveled directly to the surfaces of condenser sections 20. To prevent ultimate loss of these particles, we have inserted directional deflection plates 41 between the dehydrating zone and sections 20. The plates can be of numerous designs, however, we have determined that for good results the vapor should travel a tortuous path which is "optically tight," i.e., the path should be such that no particle could travel in a straight line from the vapor generation zone adjacent the particles being dried to the condenser sections without impinging on at least one baffle. For optimum results, it is preferred that the pathway in which the particles travel contain at least three bends each of substantially 90°, as shown by arrow B in FIGURE 3.

Viewing FIGURE 2, it will be observed from arrow A that the vapor in its course of travel from the dehydrating zone to sections 20 will be deflected off plates 41a and 41b. The purpose of providing a tortuous route for the vapor to travel is to afford an opportunity for the entrained product particles to drop out of the vapor stream. The product particles which are eliminated from this stream gradually drop to deflector plate 50 where leg 51 is extended to end above particle tray 21 located at the bottom of chamber 25. Here the recaptured fine particles are blended with the products on this particular tray. In the bottom tray only a small percentage of water is removed from the products so that no particle entrainment occurs at this point due to a lack of vapor. If desired, the recaptured fine particles could be dropped directly into hopper 30. It would be apparent that if further drying of these particles is needed, the recaptured particles could be re-directed back into the dehydrating zone at a number of appropriate locations.

The vapor subsequent to its deflection off of plates 41 passes through mesh screens 40 to condenser sections 20 where it accumulates in the form of ice. As depicted in the drawings, leg 42 connecting vertical legs 43, 44 of plate 41 is inclined from the horizontal to assure that recaptured product particles will slide down the inclined leg in progressing to the bottom of chamber 25 and plate 50.

Actuation of the ice removal means as described in our pending application, Serial No. 347,156, causes the ice to explode away from sections 20 and fall to the bottom of chamber 25 where the ice is reduced in size by breaker 27a located within each of baffles 27 and removed by a conveyor or other suitable means (not shown) through air locks 27b. Screen 40, located between sections 20 and the dehydrating zone, prevents the removed ice from re-entering the dehydrating zone.

In FIGURE 3, our static process system is illustrated. Here, a bank of trays 21 are located within chamber 25 in such a manner that upon completion of the drying operation, the trays are rolled out on track 64 or withdrawn from chamber 25 by other suitable means, whereupon the dried product particles are removed from the respective trays. Condenser sections 20 are inclined from the vertical in our static system and the vapor stream from the various trays deflects off deflector plates 60 and 61 on its way to the surface of condenser sections 20. The entrained fine particles drop to the bottom of trays 21 where they are collected when the trays are removed from chamber 25.

In evaluating our invention, we conducted a test wherein a coffee extract containing 27.1% solids was processed. Initially, the test was run with no deflecting plates positioned between sections 20 and the dehydrating zone. Entrained product particles lost in the ice and ice removal system were found to be about 2.77% of the total theoretical dry yield.

When the same test run was made with one deflecting plate designed to create a vapor path having an upwardly extending portion and two portions disposed angularly to the upwardly extending portion, the entrained particles lost in the ice and ice removal system were about 1.25% of the total theoretical dry yield.

Similarly, when the process was operated with a deflecting plate design such as that shown in FIGURE 2, the entrained particles lost in the ice and ice removal system amounted to about 0.35% of the total theoretical dry yield.

As can be determined from these test results, variation of the deflecting plate design as well as the number of deflecting plates used will cause considerable variation in the amount of entrained particles recovered.

The foregoing detailed description has been given for clearness of understanding only, and no unnecessary limitations should be understood therefrom, as modifications will be obvious to those skilled in the art.

What is claimed is:

1. In an apparatus for drying quick frozen moisture laden products comprising a chamber including a dehydrating zone and a longitudinally adjacent condensing zone in said chamber, means for maintaining a vacuum in said chamber sufficient to extract sublimation vapor from said products, means for removing noncondensable gases from said chamber, means for moving said products through said dehydrating zone, means for supplying energy of sublimation to the products being moved through said dehydrating zone in order that moisture frozen in said products sublimes to vapor, and deflecting means including baffle means arranged in said chamber intermediate said dehydrating zone and said condensing zone for changing the direction of the vapor thereby entrained particles are separated from said vapor.

2. The apparatus in accordance with claim 1 wherein said deflecting means includes a plurality of baffle means for deflecting said vapor along an optically tight tortuous path.

3. The apparatus in accordance with claim 2 wherein said optically tight tortuous path comprises at least three bends each of substantially 90° each.

4. In an apparatus for drying quick frozen moisture laden products comprising a chamber including a centrally disposed dehydrating zone and a condensing zone comprising a plurality of condensing sections adjacent the periphery of said dehydrating zone, means for maintaining a vacuum in said chamber sufficient to extract sublimation vapor from said products, means for removing noncondensable gases from said chamber, means for moving said products through said dehydrating zone, means for supplying the energy of sublimation to the products being moved through said dehydrating zone in order that the moisture frozen in said products sublimes to vapor, and a plurality of spaced apart baffles having overlapping marginal edges for deflecting said vapor along an optically tight tortuous path, said baffles arranged intermediate said dehydrating zone and said condensing zone and adjacent each condensing section thereby changing the direction of the vapor to separate entrained particles from said vapor.

5. The apparatus in accordance with claim 4 wherein said optically tight tortuous path comprises at least three bends each of substantially 90° each.

6. The apparatus in accordance with claim 4 in which said baffles are in substantially vertical alignment and at least some of said baffles are provided with an inwardly sloping section intermediate its marginal ends.

References Cited by the Examiner

UNITED STATES PATENTS

| | | | |
|---|---|---|---|
| 2,411,152 | 11/1946 | Folsom | 34—5 |
| 2,533,125 | 12/1950 | Levinson et al. | 34—5 X |
| 3,088,222 | 5/1963 | Mace et al. | 34—5 X |

FOREIGN PATENTS

| | | |
|---|---|---|
| 550,000 | 3/1958 | Canada. |
| 948,517 | 2/1964 | Great Britain. |

ROBERT A. O'LEARY, *Primary Examiner.*

W. E. WAYNER, *Assistant Examiner.*

UNITED STATES PATENT OFFICE
CERTIFICATE OF CORRECTION

Patent No. 3,276,139　　　　　　　　　　　　　　October 4, 1966

Hachiro J. Togashi et al.

It is hereby certified that error appears in the above numbered patent requiring correction and that the said Letters Patent should read as corrected below.

Column 1, line 18, for "out" read -- and --; line 54, after "size" insert -- of --; column 2, line 44, for "its" read -- it is --; column 5, line 9, for "thereby" read -- whereby --.

Signed and sealed this 22nd day of August 1967.

(SEAL)
Attest:

ERNEST W. SWIDER　　　　　　　　　　　　　　EDWARD J. BRENNER
Attesting Officer　　　　　　　　　　　　　　Commissioner of Patents